Figures 1, 2:
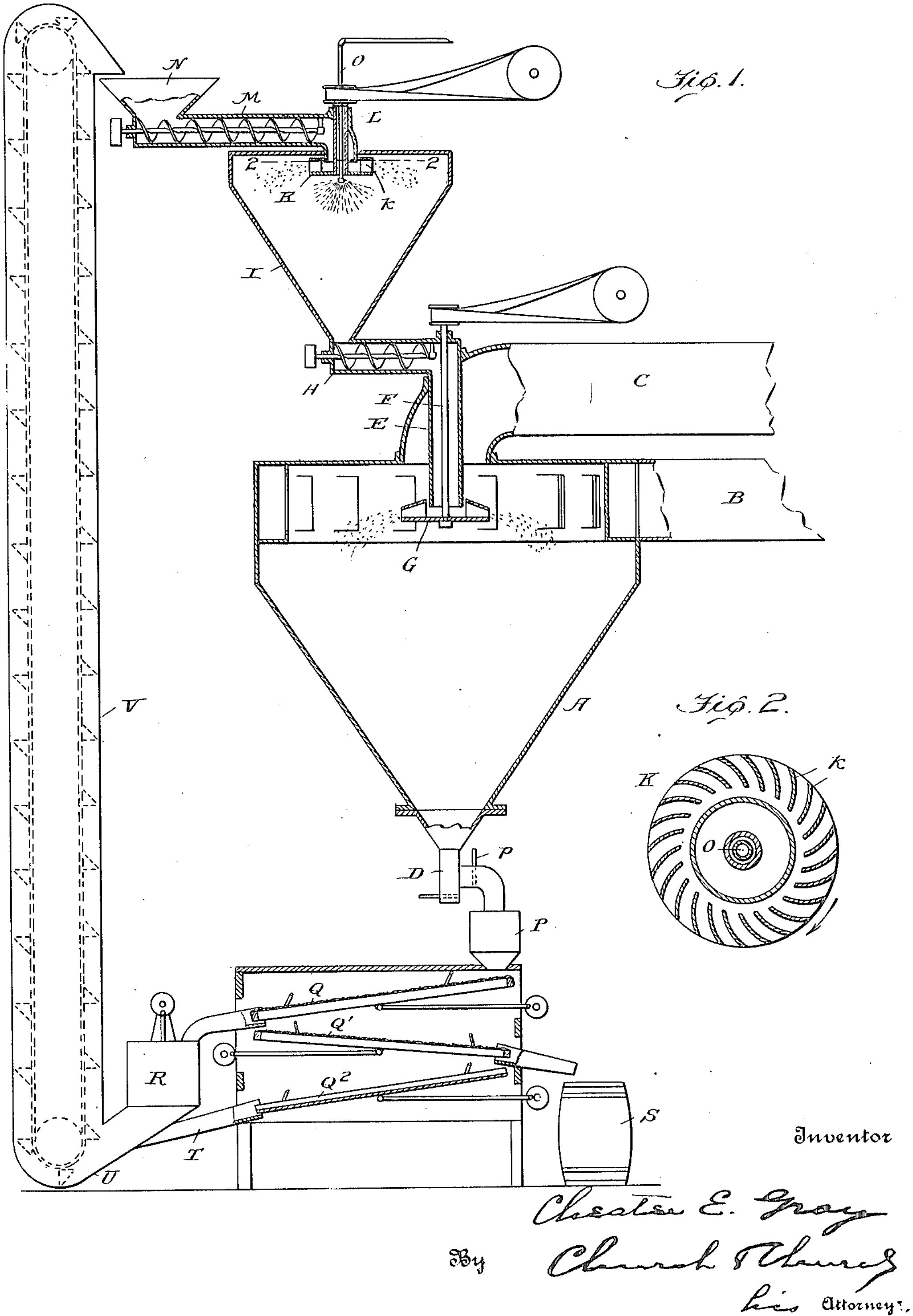

C. E. GRAY.

METHOD OF AND APPARATUS FOR DESICCATING LIQUID SUBSTANCES.

APPLICATION FILED JUNE 14, 1915.

1,157,935. Patented Oct. 26, 1915.

Inventor

Chester E. Gray

By Church & Church his Attorneys.

UNITED STATES PATENT OFFICE.

CHESTER EARL GRAY, OF EUREKA, CALIFORNIA.

METHOD OF AND APPARATUS FOR DESICCATING LIQUID SUBSTANCES.

1,157,935. Specification of Letters Patent. Patented Oct. 26, 1915.

Application filed June 14, 1915. Serial No. 34,041.

*To all whom it may concern:*

Be it known that I, CHESTER EARL GRAY, a citizen of the United States, residing at Eureka, in the county of Humboldt and State of California, have invented certain new and useful Improvements in Methods of and Apparatus for Desiccating Liquid Substances; and I do hereby declare the following to be a full, clear, and exact description of the same, reference being had to the accompanying drawings, forming part of this specification, and to the figures and letters of reference marked thereon.

The object of the present invention is to provide an improved process of and apparatus for producing dry or substantially dry material from liquids in which such material is combined or incorporated and in such wise that the dried substance will not be injuriously affected either by the method of or mechanical means for handling the same or by the action of the desiccating medium, such, for example, as dry air which, in the economical form of the apparatus, is heated to a temperature sufficiently high to carry off a large percentage of moisture.

The invention, while not limited to any particular substance, is primarily designed and best adapted for use in connection with food products, such, for example, as milk or combinations of organic substances designed for consumption as food, and which substances must, therefore, be produced in a condition which will render them readily soluble.

In the art to which the present invention relates, it has heretofore been proposed to desiccate liquid substances by methods which involve the use of a desiccating chamber through which a current of drying air is caused to travel and into which chamber the liquid substance to be desiccated is sprayed or atomized, but with such apparatus and in accordance with the methods in vogue, a considerable percentage of the desiccated substance is lost with the outgoing air or drying medium, and the substance itself is liable to be affected, and its quality impaired by the desiccating action, thus necessitating extreme care in the practice of the process and the same is true of other processes at present in vogue and heretofore proposed, wherein the substance to be desiccated is dried, while mechanically supported, either in a solid or sheet-like form, or in comminuted form, as, for example, where a liquid substance is absorbed by or used to moisten a quantity of previously prepared or dried material of the same character and the whole is then carried through a drying apparatus, where it is subjected to the action of drying currents of air while being supported by the conveyer.

In accordance with the present invention, the difficulties encountered in the desiccation of liquid substances of the character specified are largely overcome and a product results which retains all of its nutrient and keeping qualities to the highest degree, as well as the necessary ready solubility of the completed product. This result, it is thought, is largely due to the fact that the substance to be desiccated is subjected to the desiccating action, while it is coated upon previously dried nuclei of the substance or of a substance with which it is to be combined, and during the desiccating action, the coated nuclei are free in the desiccating atmosphere or without mechanical support; thus permitting the greatest uniformity in the desiccating action, and at the same time preventing any adhesion or contact between the particles themselves or between the particles and the supporting body such as would disturb the liquid coating during the desiccating process.

In carrying the invention into practice, it is preferred to employ a continuous process; that is to say, starting with the assumption that a comminuted nucleus mass has been provided which may be a previously dried substance of the same kind as that to be desiccated, or of a substance with which it is to be combined, or it may even be an inert substance, in so far as the use to which the final product is to be put is concerned. This nucleus mass is coated, while in comminuted form, with the liquid containing the substance to be desiccated, preferably while the nuclei are suspended or are traversing an atmosphere in which the liquid substance is carried in comminuted form. The coated nuclei thus formed are then caused to traverse a desiccating atmosphere in which atmosphere they travel until the coating is deprived of its liquid content to the desired percentage. In practice, the percentage of liquid remaining is so small that the product is, to all intents and purposes, a dried product. Portions or the whole of this dried product may be again subjected to the process of coating and desiccation and in the most approved form of apparatus it is subjected to a separating process, whereby the intermediate sized particles are withdrawn as the finished product, while the finer particles, and the larger particles after being pulverized, are carried back to the coating chamber, recoated with the liquid substance and again desiccated.

Various forms of apparatus will at once suggest themselves to those skilled in the art, when the invention is once understood, and hence it is not desired to limit the present application to any particular form or construction of apparatus. The accompanying drawings, therefore, represent diagrammatically a form of apparatus which is adapted to give good commercial results, although no particular attention has been paid in this illustration to the relative proportions of the parts.

In said drawings,—Figure 1 is a diagrammatic section illustrating the preferred form of apparatus. Fig. 2 is a detail section on the line 2—2 of Fig. 1.

The desiccating chamber A which, while it may be of any known or preferred form or type, is preferably of conical formation, with a peripheral air inlet duct B at the top. Said air inlet is adapted to inject the air tangentially, whereby a cyclonic current of air will be set up in the chamber, and it will be understood that the incoming air or desiccating medium should be properly heated, or dried so as to be competent to carry off the requisite volume of moisture. The exit is centrally at the top of the desiccating chamber, as indicated at C, while the discharge for the dried product is at the bottom or apex of the cone at the point indicated at D. Extending into the desiccating chamber at a point remote from the side walls, and preferably centrally of and in proximity to the upper end of the chamber, is an inlet duct E, which may conveniently be in the form of a pipe through which a shaft F extends down to a vaned distributer G, said shaft and distributer being driven by any suitable power mechanism. Material enters the duct E at the upper end, being preferably carried thereto by a screw conveyer H which receives the product from the coating chamber I. The coating chamber I is conveniently of conical form, whereby the coated material will gravitate to the exit and be delivered to the conveyer H. At the upper end of the coating chamber there is provided a means for introducing the nucleus mass and distributing the same in the chamber, as well as a means for maintaining in the chamber an atmosphere which carries the liquid, to be desiccated, in a comminuted form.

The convenient and preferred form of apparatus embodies a rotary distributer K preferably having distributing vanes $k$ thereon and adapted to be driven by a hollow shaft L. The nucleus mass is fed to the rotary distributer K by a conveyer which may conveniently be a screw conveyer M, receiving its material from a hopper N. Extending down through the hollow shaft L is a pipe O terminating in an atomizing nozzle and the liquid material to be desiccated is forced through the pipe and nozzle by suitable pressure means. The material so introduced is designed to maintain in the coating chamber I an atmosphere which is full of comminuted liquid material down through which the comminuted nucleus mass is showered and whereby the nuclei will be coated each with its proper charge of liquid material.

At the bottom of the desiccating chamber, there is preferably provided a grading mechanism which will separate the desiccated material into three grades. The intermediate grade, is preferably that extracted as the finished product. This grading mechanism embodies a hopper P into which the desiccated material is discharged from the desiccating chamber under the control of a valve $p$ and from the hopper P the material is permitted to pass onto an inclined shaking screen Q of relatively large mesh. This screen is designed to take out of the product only the larger particles which pass from the screen into a pulverizing apparatus R by which they are reduced to a finer condition. The material passing through the screen Q drops onto a reversely inclined shaking screen Q′, the mesh of which is of such size as to permit the passage of only the finer particles, while the intermediate sized particles are led away from the screen into a receptacle S as the finished product. The finer particles pass down onto a shaking floor $Q^2$ from which they are led through a suitable conduit T into a receiver U, which may also receive the pulverized material from the pulverizer R. A conveyer, conveniently a bucket or flight conveyer V, serves to carry the material from the receiver U up into the hopper N, this material constituting what has been hereinbefore referred to as the nucleus mass.

In operation a suitable initial nucleus mass is provided, either the dried product of a previous operation or a dried product derived from any suitable source. This mass is fed from the hopper N into the coating chamber I, and is distributed so as to shower uniformly through the chamber by the rotary distributer K. Simultaneously with this operation, the atmosphere in the coating chamber I is charged with comminuted liquid material to be desiccated. In the case of milk, it is preferably milk which has been previously concentrated or deprived of a considerable percentage of its liquid content by ordinary concentration methods and apparatus, well understood at this day, and which may be operated without injuriously affecting the quality of the product. There is no drying action in the coating chamber, inasmuch as the proportions of nucleus material and comminuted liquid are preferably maintained in such relation that the nucleus material in becoming coated will take up the supply of liquid and result in a product which is merely coated or only slightly moist when considered as a mass. This material gravitates down to the bottom of the coating chamber and is fed thence to the desiccating chamber, in which it is distributed by the rotary distributer G. The rotary distributers in both instances are preferably provided with vanes *k*, Fig. 2, which will effectually break up the nucleus mass into individual nuclei, and the nuclei will be distributed uniformly throughout the chamber so that all sizes will be subjected to the action of the desiccating medium.

The proportions of the desiccating chamber and quantity of material fed to the same are so proportioned that the liquid content will be practically evaporated, leaving a substantially dry product or a product containing a very small percentage of moisture. In this action the coated nuclei travel centrifugally through the desiccating medium while the desiccating medium travels centripetally, in accordance with the invention of my prior Patent No. 1,107,784, dated Aug. 18, 1914, and the product is delivered from the lower end of the desiccating chamber in the form of particles which will be fed to the grading apparatus. In passing through the grading apparatus, the product will be so controlled that only the desired quantity will be deducted as finished product, a sufficient quantity of the dried material being always retained in the operative circuit, as it were, to provide a nucleus mass which will be sufficient to form a base for a coating of liquid in quantity proportioned to the capacity of the apparatus.

As the result of the process, the apparatus may be operated continuously, and after it is once in operation the output will be equal to or greater than would be possible with an apparatus in which the liquid itself is sprayed into the current of desiccating medium.

The present process results in the production of a product having particles of appreciable size which will readily combine with and be soluble in a liquid menstruum, such as water, and in this respect it is superior to the product of other processes in which the particles exist in such an exceedingly fine state of sub-division as to be water repellent, or at least difficult of mixture and solution.

What is claimed as new is:

1. The method of desiccating substances which consists in providing a comminuted nucleus mass, discharging the mass in subdivided form into an atmosphere carrying the substance to be desiccated in sub-divided liquid form, whereby the nuclei become coated therewith, and in subsequently evaporating the moisture from the particles.

2. The method of desiccating substances which consists in providing a comminuted nucleus mass, subjecting the mass in subdivided form to an atmosphere carrying the substance to be desiccated in sub-divided liquid form, whereby the nuclei become coated therewith, and in subsequently evaporating the moisture from the particles while the particles are free from mechanical support in the drying medium.

3. The method of desiccating substances which consists in providing a comminuted nucleus mass, then coating the nuclei with liquid containing the substance to be desiccated and in subjecting the coated nuclei to the action of a desiccating medium while freely suspended therein until the liquid content is evaporated sufficiently to prevent coalescence or adhesion between the particles.

4. The process of desiccating liquid substances in a continuous cycle using a nucleus mass to which the liquid substance is added, which consists in coating the nuclei with the liquid substance, evaporating the aqueous content, grading the dried material to separate out the finished product and utilizing the remainder of the dried material as the nucleus mass in the repetition of the cycle of operations.

5. The process of desiccating liquid substances in a continuous cycle using a nucleus mass to which the liquid substance is added, which consists in coating the nuclei with the liquid substance, evaporating the aqueous content, grading the dried material to separate out the finished product, pulverizing the larger particles of the remaining dried material and utilizing the pulverized material as the nucleus mass in the repetition of the cycle of operations.

6. The process of desiccating liquid substances in a continuous cycle using a nucleus mass to which the liquid substance is added, which consists in coating the nuclei with the liquid substance, evaporating the aqueous content, grading the dried material to separate out the finished product, pulverizing the larger particles of the remaining dried material, and utilizing the pulverized material and the finer particles of the dried material as the nucleus mass in the repetition of the cycle of operations.

7. The method of desiccating liquid substances which consists in concentrating the substance to be desiccated, providing a comminuted nucleus mass, discharging the mass in sub-divided form and simultaneously discharging the concentrated liquid substance in sub-divided form into contact therewith whereby the nuclei are coated with the liquid substance and in subsequently evaporating the moisture from the particles.

8. The method of desiccating liquid substances which consists in concentrating the liquid substance to be desiccated, providing a comminuted nucleus mass, then distributing the nuclei and liquid substance in sub-divided form into contact with each other while unsupported by mechanical means, whereby the nuclei become coated with liquid substance and in subsequently evaporating the moisture from the particles while the particles are free from mechanical support in a drying medium.

9. In an apparatus for desiccating liquid substances, the combination with a chamber, means for showering a nucleus mass in subdivided form into said chamber, means for simultaneously showering the liquid substance to be desiccated into said chamber, whereby the two substances will be brought into intimate contact with each other, and means for passing the nuclei carrying the liquid substance through a drying medium.

10. In a desiccating apparatus, the combination with a moistening chamber and a desiccating chamber, means in each of said chambers for distributing a nucleus mass therein in comminuted form, means in the moistening chamber for coating the nuclei with a liquid substance to be desiccated, and means for transferring the coated nuclei from the moistening chamber to the desiccating chamber.

11. In a desiccating apparatus, the combination with a nucleus moistening chamber, a desiccating chamber, means for transferring the material from the moistening to the desiccating chamber, means for moistening the nuclei in the moistening chamber, means for drying the nuclei in the desiccating chamber, a grading mechanism receiving the product from the desiccating chamber for separating out a percentage thereof, and conveyer means for carrying the remaining portion of the dried material from the grading mechanism to the moistening chamber.

12. In a desiccating apparatus, the combination with a moistening chamber, a desiccating chamber, means for conducting material from the moistening chamber to the desiccating chamber, means for distributing the material in said chambers, and means in the moistening chamber for moistening the distributed material with a liquid substance to be desiccated, a grading mechanism in position to receive the dried material from the desiccating chamber and for separating out a percentage of said material, a conveyer for carrying the remaining portion of the dried material from the grading mechanism back to the moistening chamber, and means for directing a current of drying air through the desiccating chamber.

13. In a desiccating apparatus, the combination with a moistening chamber, means for concentrating a liquid substance to be desiccated, means for distributing said concentrated liquid substance in the moistening chamber, and means for simultaneously distributing nucleus material in comminuted form in said chamber, whereby the nuclei are moistened, a desiccating chamber, means for conveying the moistened material from the moistening chamber to the desiccating chamber, means for distributing the moistened material in comminuted form in the desiccating chamber, and means for maintaining in said desiccating chamber a cyclonic current of drying air.

CHESTER EARL GRAY.